United States Patent
McClymonds et al.

(10) Patent No.: US 9,041,865 B2
(45) Date of Patent: May 26, 2015

(54) VIDEO SWITCH

(71) Applicant: Haworth, Inc., Holland, MI (US)

(72) Inventors: Ryan J. McClymonds, Holland, MI (US); Eric B. Snavely, Rochester, NY (US); Steffen Lipsky, Holland, MI (US); Robert C. Wayner, Holland, MI (US); Steven J. King, Holland, MI (US); Randell E. Pate, Jenison, MI (US); Timothy J. Warwick, Sparta, MI (US); Patrick E. Young, Rockford, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 13/911,382

(22) Filed: Jun. 6, 2013

(65) Prior Publication Data
US 2013/0329136 A1    Dec. 12, 2013

Related U.S. Application Data

(60) Provisional application No. 61/657,396, filed on Jun. 8, 2012.

(51) Int. Cl.
| H04N 5/268 | (2006.01) |
| H04N 7/14 | (2006.01) |
| G06F 3/00 | (2006.01) |
| H01J 3/22 | (2006.01) |

(52) U.S. Cl.
CPC .................................... *H04N 5/268* (2013.01)

(58) Field of Classification Search
CPC ......... H04N 5/268; H04N 5/183; H04N 7/15; H04N 7/142; H04N 21/4122; H04N 21/4361; H04M 3/567; H04L 63/0428
See application file for complete search history.

(56) References Cited

U.S. PATENT DOCUMENTS

| 5,033,804 A | 7/1991 | Faris |
| 5,130,494 A | 7/1992 | Simonton et al. |
| 5,230,552 A | 7/1993 | Schipper et al. |
| 5,362,923 A | 11/1994 | Newhouse et al. |
| 5,511,348 A | 4/1996 | Cornell et al. |
| 5,530,435 A | 6/1996 | Toms et al. |
| 5,684,469 A | 11/1997 | Toms et al. |
| 5,724,778 A | 3/1998 | Cornell et al. |
| 5,765,797 A | 6/1998 | Greene et al. |
| D408,355 S | 4/1999 | Welsh et al. |

(Continued)

FOREIGN PATENT DOCUMENTS

| EP | 1 699 238 | 1/2006 |
| WO | 2010/116033 | 10/2010 |

OTHER PUBLICATIONS

Written Opinion of the International Searching Authority for corresponding PCT Application No. PCT/US13/44455 mailed Oct. 24, 2013.

(Continued)

*Primary Examiner* — Jefferey Harold
*Assistant Examiner* — Sean Haiem
(74) *Attorney, Agent, or Firm* — Warner Norcross & Judd LLP (57) ABSTRACT

A video switch system providing a collaborative environment for one or more users to share information. In the current embodiment, the video switch system enables users to quickly connect to the system, present information, have a video conference, or have a multi-user wireless video session, or a combination thereof, in a collaborative manner.

28 Claims, 8 Drawing Sheets

(56) References Cited

U.S. PATENT DOCUMENTS

| | | |
|---|---|---|
| 5,907,285 A | 5/1999 | Toms et al. |
| 5,942,984 A | 8/1999 | Toms et al. |
| 5,980,279 A | 11/1999 | Müller |
| 6,003,275 A | 12/1999 | Cornell et al. |
| 6,081,356 A | 6/2000 | Branc et al. |
| 6,101,773 A | 8/2000 | Chau et al. |
| 6,111,195 A | 8/2000 | Hand et al. |
| 6,133,845 A | 10/2000 | Toms et al. |
| 6,134,844 A | 10/2000 | Cornell et al. |
| 6,135,583 A | 10/2000 | Simon et al. |
| 6,162,071 A | 12/2000 | Müller |
| 6,168,458 B1 | 1/2001 | Kraft |
| 6,170,200 B1 | 1/2001 | Cornell et al. |
| 6,211,796 B1 | 4/2001 | Toms et al. |
| 6,241,329 B1 | 6/2001 | Nielsen |
| 6,279,761 B1 | 8/2001 | Niewiadomski et al. |
| 6,286,441 B1 | 9/2001 | Burdi et al. |
| 6,327,983 B1 | 12/2001 | Cronk et al. |
| 6,336,414 B1 | 1/2002 | Stewart et al. |
| 6,337,856 B1 | 1/2002 | Schanhals et al. |
| 6,352,323 B1 | 3/2002 | Rives |
| 6,358,083 B1 | 3/2002 | Kraft |
| 6,424,248 B1 | 7/2002 | Toms et al. |
| 6,629,386 B1 | 10/2003 | Cornell et al. |
| 6,629,505 B1 | 10/2003 | Cronk et al. |
| 6,851,226 B2 | 2/2005 | MacGregor et al. |
| 6,892,650 B2 | 5/2005 | Baloga et al. |
| 6,895,868 B1 | 5/2005 | Cronk et al. |
| 6,896,547 B2 | 5/2005 | Caveney |
| 6,922,949 B2 | 8/2005 | Cornell et al. |
| 6,931,795 B1 | 8/2005 | Baloga et al. |
| 6,953,231 B2 | 10/2005 | Markofer |
| 7,032,523 B2 | 4/2006 | Forslund, III et al. |
| 7,105,743 B2 | 9/2006 | Caveney |
| 7,227,082 B2 | 6/2007 | Caveney |
| 7,434,166 B2 * | 10/2008 | Acharya et al. ............... 715/740 |
| 7,461,484 B2 | 12/2008 | Battey et al. |
| 7,761,505 B2 * | 7/2010 | Krzyzanowski et al. ..... 709/204 |
| 7,825,337 B2 | 11/2010 | Young, IV |
| 7,892,148 B1 | 2/2011 | Stauffer et al. |
| 7,893,953 B2 | 2/2011 | Krestakos et al. |
| 7,922,128 B2 | 4/2011 | Young, IV |
| 7,926,430 B2 | 4/2011 | Bakker et al. |
| 8,074,581 B2 | 12/2011 | Epstein et al. |
| 8,896,656 B2 | 11/2014 | Epstein et al. |
| 2005/0036509 A1 * | 2/2005 | Acharya et al. ............... 370/466 |
| 2005/0046315 A1 | 3/2005 | Doane et al. |
| 2006/0117669 A1 | 6/2006 | Baloga et al. |
| 2007/0175131 A1 | 8/2007 | Mueller et al. |
| 2007/0181044 A1 | 8/2007 | Baloga et al. |
| 2008/0209479 A1 | 8/2008 | Zerr et al. |
| 2008/0295745 A1 | 12/2008 | Hamilton et al. |
| 2009/0102341 A1 | 4/2009 | Young, IV |
| 2010/0302454 A1 * | 12/2010 | Epstein et al. ................ 348/705 |
| 2011/0096138 A1 * | 4/2011 | Grimshaw ................ 348/14.08 |
| 2011/0216153 A1 * | 9/2011 | Tasker ...................... 348/14.02 |
| 2011/0279350 A1 * | 11/2011 | Hutchinson et al. .......... 345/1.1 |
| 2014/0040781 A1 | 2/2014 | Epstein |
| 2014/0047339 A1 | 2/2014 | Epstein |
| 2014/0261096 A1 | 9/2014 | Epstein et al. |
| 2014/0285614 A1 | 9/2014 | Epstein et al. |
| 2014/0285720 A1 | 9/2014 | Epstein et al. |

OTHER PUBLICATIONS

International Search Report for corresponding PCT Application No. PCT/US13/44455 mailed Oct. 24, 2013.

Tektronix, Inc., Grass Valley Group Operation Manual—Software Release 3.0—Model 1200 Digital Production Switcher, Mar. 1997, pp. 1-196.

* cited by examiner

VIDEO SWITCH

BACKGROUND OF THE INVENTION

The present invention relates to systems for routing video signals from varying sources to one or more displays in a working, collaborative environment.

Generally, when people want to connect to a monitor or TV screen to present from their laptop, they will use a video cable. There are a few different types of cables and associated ports for them on both TVs and laptops, so the user may want to make sure they have the right cable and ports available to connect to the monitor or TV screen. They may also want to use the TV remote to power on the TV, as well as to select the correct port. With this conventional system, if more than one person would like to present, they would need to unplug the cable from the original laptop and plug it into their laptop, assuming they have the right port to accept it. This process of connecting to a TV to display your laptop may be time consuming and overly complicated.

SUMMARY OF THE INVENTION

The present invention in accordance with the current embodiment provides a video switch system capable of enabling users to quickly connect, present information, have a video conference, or a multi-user wireless video session, or a combination thereof, in a collaborative manner.

In one embodiment, the video switch system includes a switching unit operable to receive one or more video sources via a modular interface. The modular interface may include one or more modular cards capable of removable insertion within the switching unit, where each of the modular cards is configured to interface with a device to receive an associated video source.

The video switch system may include a wireless presentation system operably connected to the switching unit, and being configured to receive one or more video sources via a network interface, including, for example, via an Ethernet cable or a wireless Ethernet connection.

The video switch system may also include an operator interface operably connected to the switching unit. The operator interface may include a touch sensitive interface with a first input and a wireless video mode selection input selectable by one or more users. With these inputs, users can command the switching unit to direct various video sources to one or more monitors, including, for example, video sources received through the modular interface or through the wireless presentation system, or any combination thereof.

In one embodiment, one or more inputs of the operator interface may be capable of indicating at least three states associated with a video source. For example, an input of the operator interface may transition from an inactive state to a standby state in response to detection of a video source associated with the input. If a user selects the input to command the system to direct the video source to a monitor, the input may then transition from the standby state to an active state. These states may be identifiable by a change in light intensity of the input, where the light intensity increases as the input transitions from the inactive state to the standby state, and further increases as the input transitions from the standby state to the active state. Conversely, a transition from active to standby may be indicated by a corresponding decrease in light intensity of the input.

In one embodiment, the present invention may allow for great flexibility in both applications and installation. It may also include a power and data hatch with a touch sensitive interface to allow for video signal and mode control.

In one aspect, the present invention provides an effective and adaptable system for enabling users to collaborate or share information on one or more monitors. The system may include a modular interface capable of being adapted to accept a variety of video sources such that the system may provide a standardized interface for various equipment types, and may be upgraded to communicate with additional or different video interfaces.

Before the embodiments of the present invention are explained in detail, it is to be understood that the present invention is not limited to the details of operation or to the details of construction and the arrangement of the components set forth in the following description or illustrated in the drawings. The present invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the present invention to any specific order or number of components. Nor should the use of enumeration be construed as excluding from the scope of the present invention any additional steps or components that might be combined with or into the enumerated steps or components.

DESCRIPTION OF THE CURRENT EMBODIMENT

A video switch system according to one embodiment of the present invention is shown in FIGS. 1-12 and generally designated 10. The video switch system 10 may include a switching unit 18 that coordinates displaying information on the monitor 100. The switching unit 18 may operate by taking signal sources from various devices, such as a laptop 32 or a wireless presentation system 22, and cables 32 and directing one or more of the signal sources through one signal cable 34 to a TV or monitor 100, as shown in the illustrated embodiments of FIGS. 1 and 2. This may be accomplished by first connecting a source device, such as a laptop 30, to a cable 32 that comes out of a hatch 13 (shown in further detail in the illustrated embodiments of FIGS. 3-4 and 9). The cable 32 of the hatch 13 may connect to a modular video/audio input card 14 (shown in the illustrated embodiments of FIGS. 5 and 6) which is, in turn, connected to a switching unit 18 (shown in further detail in the illustrated embodiment of FIGS. 7 and 8). The cable 32 may provide a VGA interface or an HDMI interface in addition to an audio interface to the switching unit 18. Alternatively, a separate cable 32 may provide an audio interface from the device to the switching unit 18.

The switching unit 18 may include a control system comprising a variety of circuitry, including one or more processors, capable of receiving and directing signals to one or more monitors 100. The switching unit 18 may output command signals to control operation of external devices, such as a monitor 100 or a wireless presentation system 22. The switching unit 18 may also receive command signals, for example from the touch interface 12 or the wireless presentation system 22, to determine which source device or devices to display on the monitor 100 or whether to turn ON or OFF an external device.

The switching unit 18 may process video and audio signal based on type, and send the processed signal through an output cable 34, to the input port on the monitor 100. The user may select which source device to display on the monitor 100 by using a touch interface 12, which is integrated with the hatch 13 in the illustrated embodiments of FIGS. 3-4 and 9. Alternatively, the touch interface 12 may be separate from the hatch 13.

Figure 1:
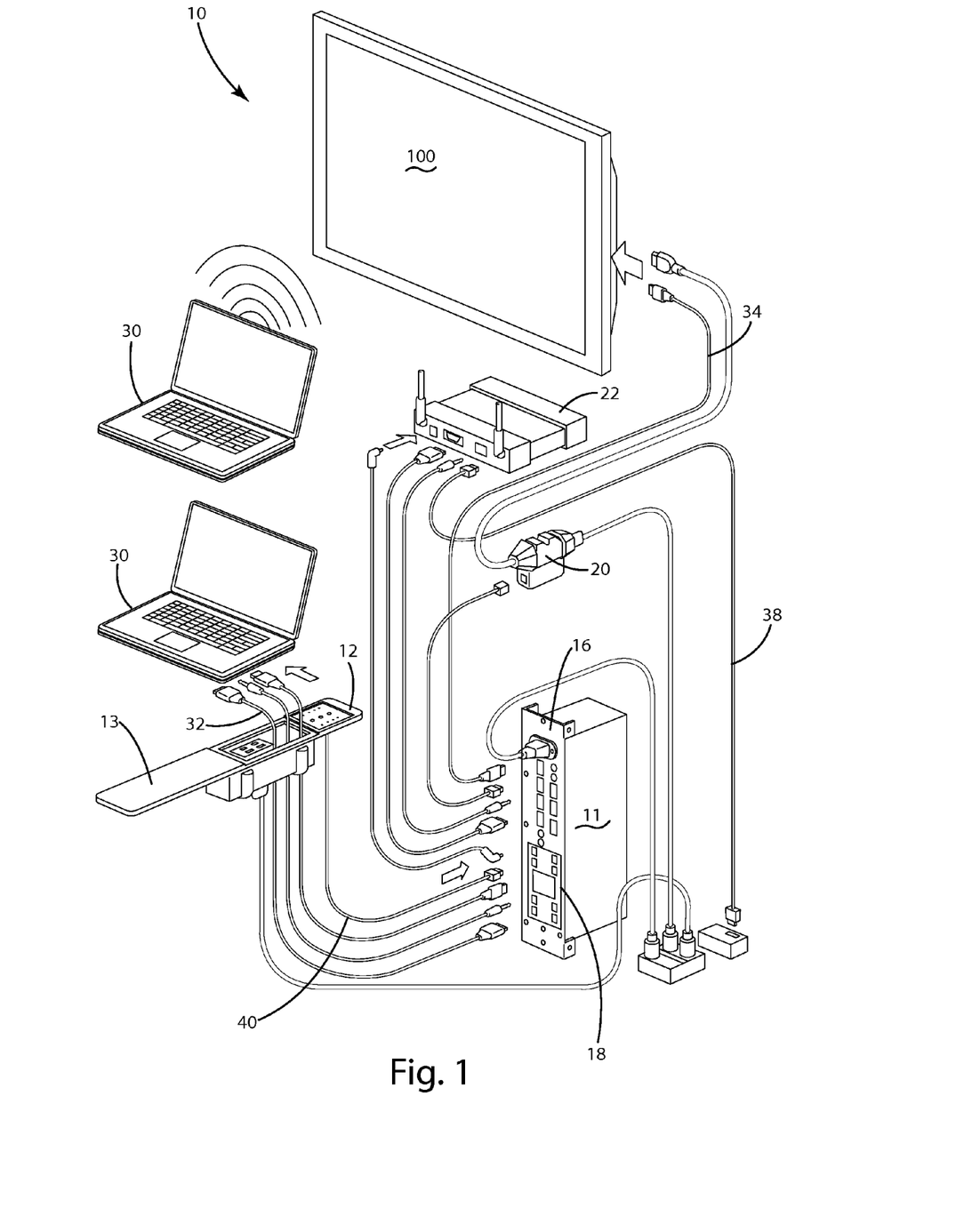
FIG. 1 is a representative view of a video switch system according to a current embodiment of the present invention.
Figure 2:
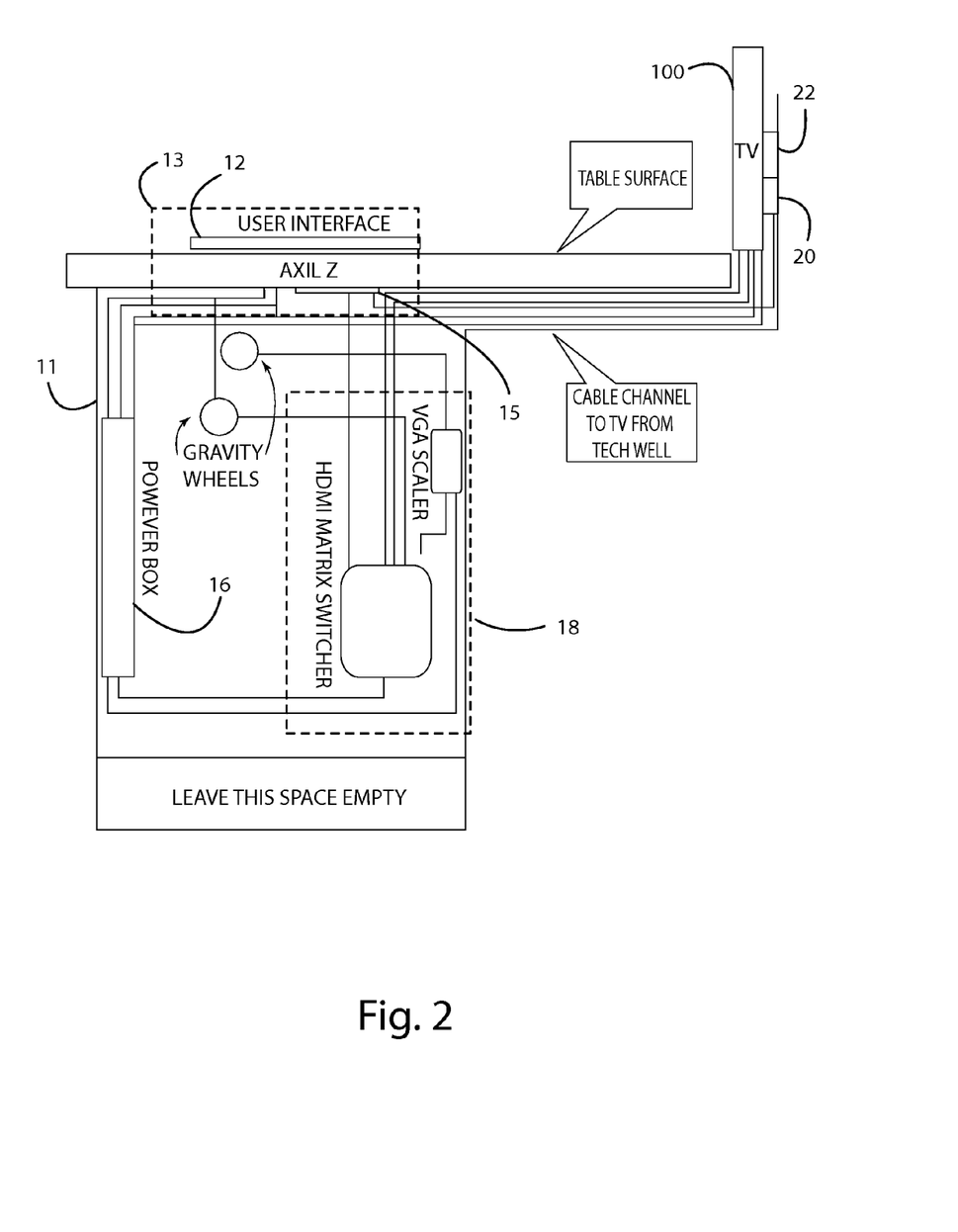
FIG. 2 is a representative view of a video switch system according to a current embodiment of the present invention.
Figure 3:
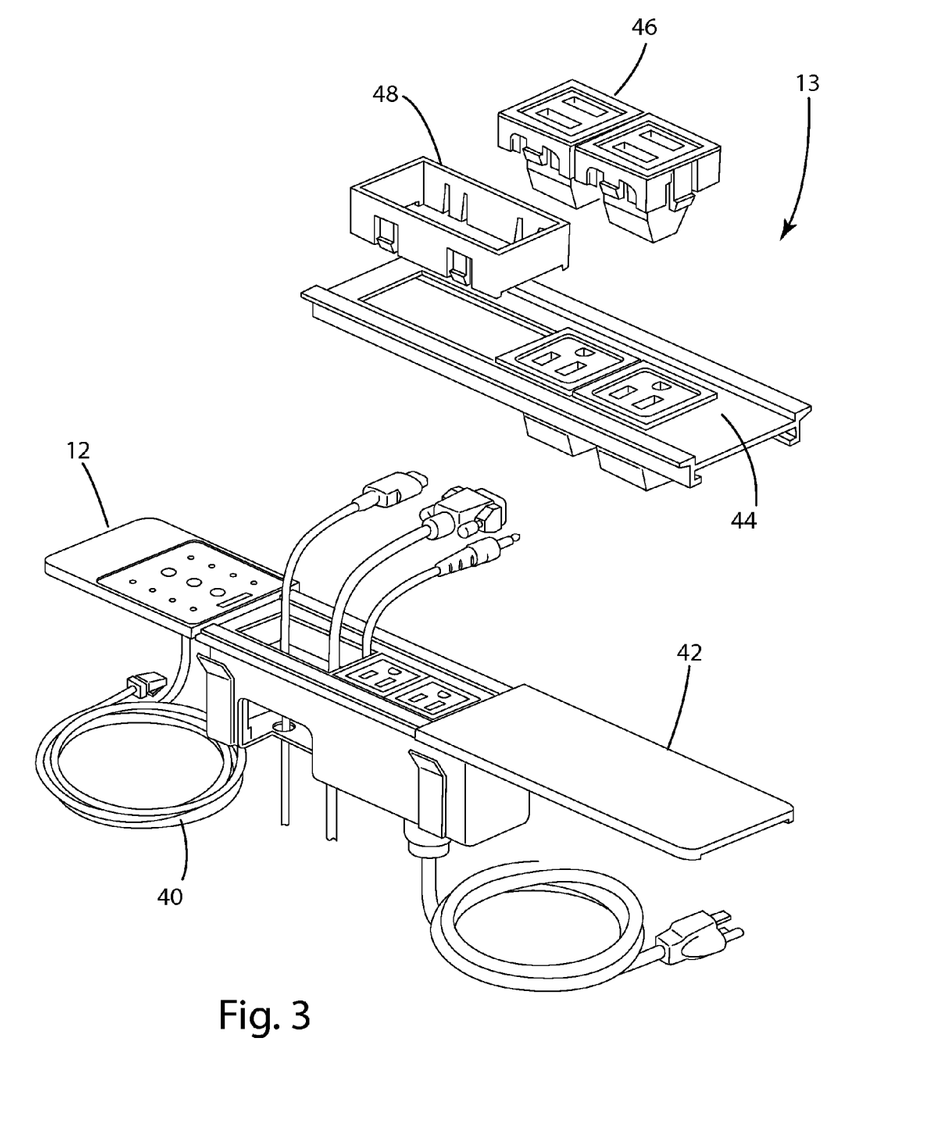
FIG. 3 is a representative view of a video switch system according to a current embodiment of the present invention.
Figure 4:
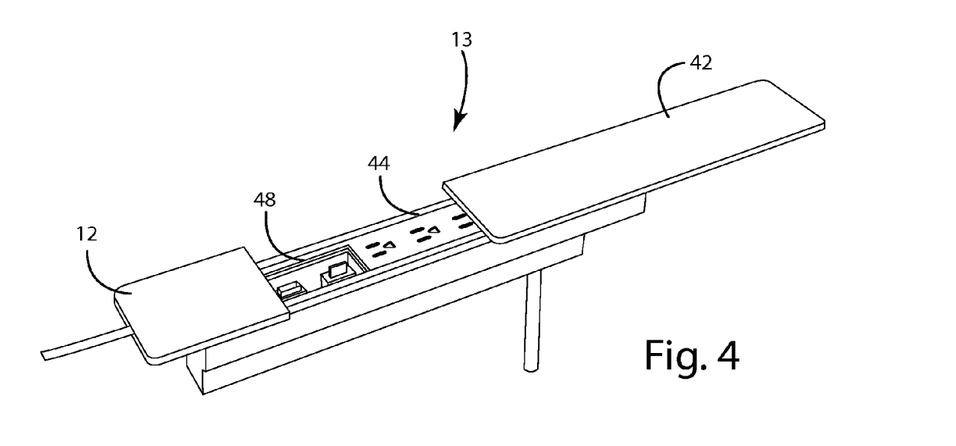
FIG. 4 is a video switch hatch configuration of a video switch system according to the current embodiment of the present invention.
Figure 5:
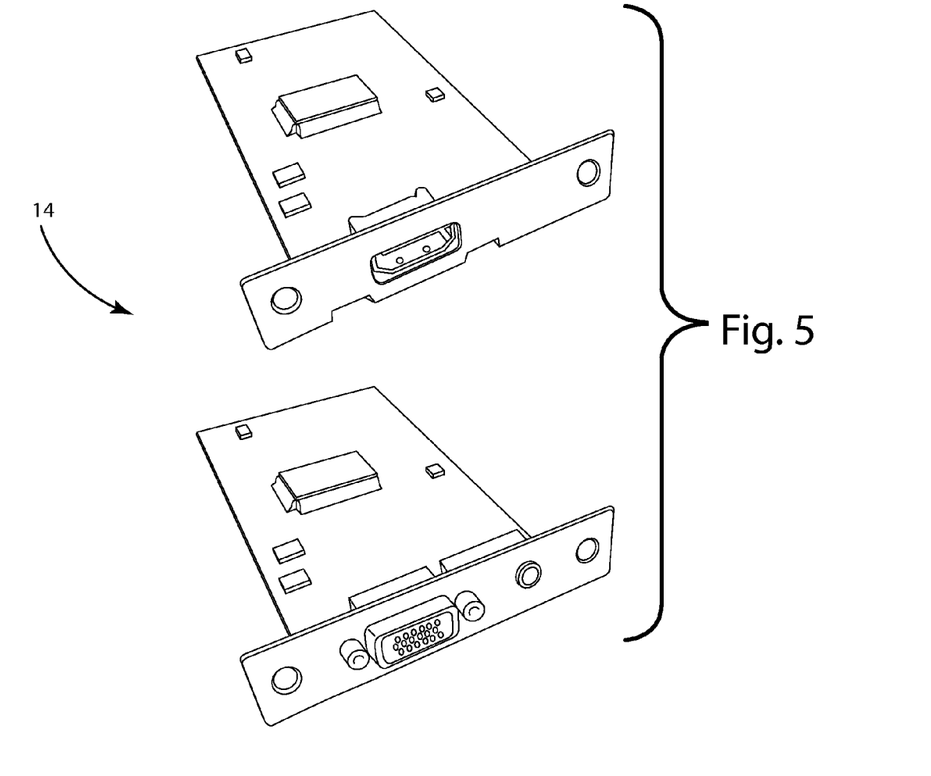
FIG. 5 is a modular video/audio input card of a video switch system according to the current embodiment of the present invention.
Figure 6:
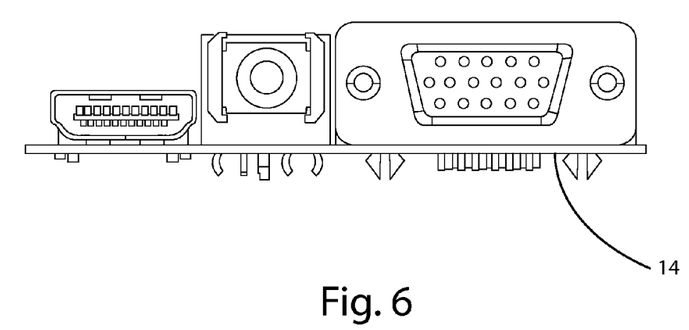
FIG. 6 is a modular video/audio input card of a video switch system according to the current embodiment of the present invention.
Figure 7:
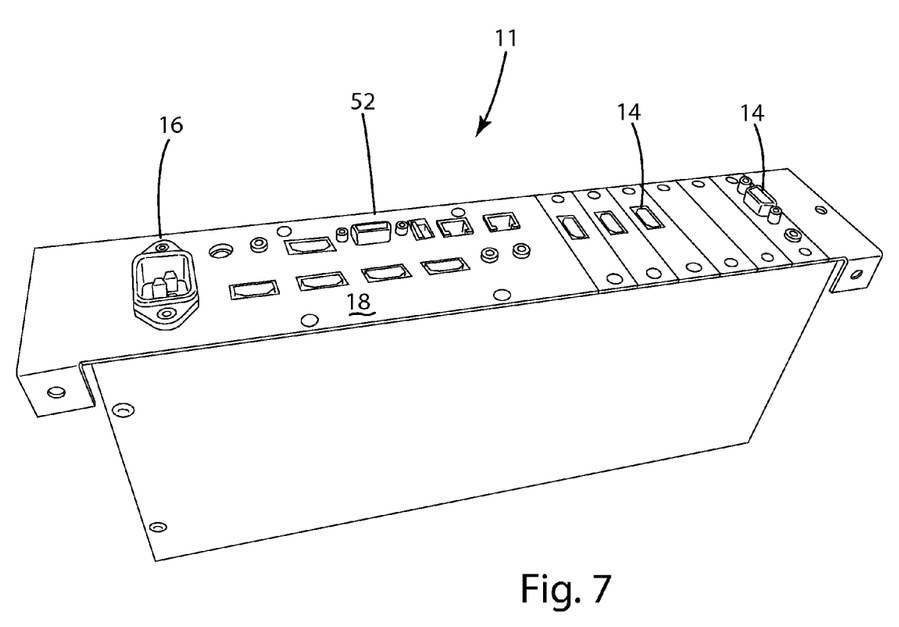
FIG. 7 is a switching unit of a video switch system according to a current embodiment of the present invention.
Figure 8:
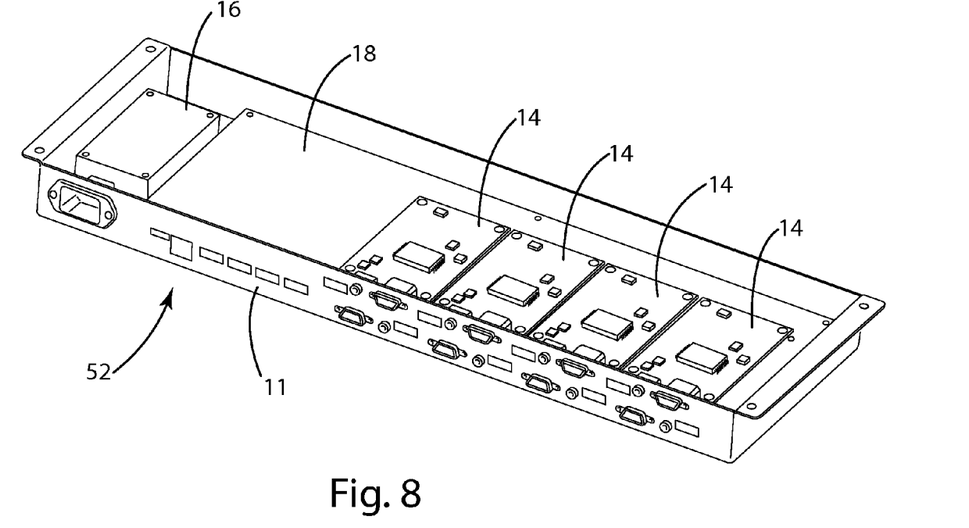
FIG. 8 is a switching unit of a video switch system according to a current embodiment of the present invention.

In the illustrated embodiments of FIGS. 3-4, the hatch 13 and touch interface 12 are shown in an integrated configuration. The hatch 13 may include a sliding cover 42 that partially surrounds flanges or a bezel of the hatch 13 such that the sliding cover 42 is capable of sliding along a longitudinal axis of the hatch 13, thereby selectively concealing or exposing a cable bay 48 and cables 32 that interface to the switching unit 18. The flanges of the hatch 13 and the sliding cover 42 in the illustrated embodiment are formed from aluminum, but other materials and finishes are contemplated, such as glass, wood, or stone.

The hatch 13 may also provide access to one or more additional features, such as utility power connections 44 and USB interfaces 46. In embodiments with a USB interface, a USB cable may provide a USB connection between the switching unit 18 and the hatch 13. Alternatively, the USB interface may provide power to a device without connecting it to the switching unit 18.

By using the touch sensitive interface 12, users can display their source video to the monitor 100, or they can put the session into one of two modes "Video Conference" and/or "Wireless Video". The touch sensitive interface 12 may operatively couple to the switching unit 18 via cable 40.

The Wireless Video mode may allow users to display their laptop onto the monitor 100 with no cables connected. This may be accomplished through the use of the Wireless Presentation System (WPS) 22, shown in further detail in the illustrated embodiment of FIG. 10. The WPS 22 may connect, via one or more cables 36, into a dedicated port of the switching unit 18, and may be selected as an output to the monitor 100 by use of the touch sensitive interface 12. Because the wireless video mode is not limited by the number of cables present or available, the system 10 with wireless video sharing capabilities may enable a larger number of users to share the system 10, possibly an unlimited number of users. However, cable connections may still be provided for users without access to the wireless network. Alternatively, cable connections may not be provided. In the illustrated embodiment of FIG. 1, the WPS 22 is connected to a network via Ethernet cable 38. Alternatively or in addition to this configuration, the WPS 22 may connect to the network wirelessly. Alternatively or additionally, the WPS 22 may receive wireless signals directly from one or more devices, such as one or more laptops. Although shown as a separate component, it should be understood that the WPS 22 may be incorporated into the switching unit 18 or other components described herein.

When more than one source device has software to connect to the WPS 22, multiple source devices may display on the monitor 100. The WPS software may have a graphic user interface that controls which wireless source device is currently displayed. The WPS software also may allow multiple source devices to be displayed on one monitor simultaneously. For example, the WPS 22 may be configured to display four source devices in a quad screen mode at the same time. Other source devices may display with a cable connection to the switching unit 18. In one configuration, the touch interface 12 may be in communication with the switching unit 18 to selectively provide a video output to a video communication server (VCS) to select whether a source device connected wirelessly or a cabled source device is displayed on the monitor 100. In other words, based on the output to the VCS, a local image from the selected source device may be displayed on the monitor 100.

In Video Conference mode, the switching unit 18 takes an input from a video conferencing system (not shown) and sends images to a monitor 100. The switching unit 18 may then also take the output from the same video conference system and send it to a dedicated input on itself, to be redisplayed through a secondary output to a second monitor 100. Using this method, the present invention may display remote participants on one screen 100, and send video data to the remote location and have that same video data displayed on another screen 100. In a single monitor configuration, local and remote video images may be displayed on the single monitor 100 using video conference equipment (not shown), which may merge the two video feeds together for simultaneous display on the one monitor 100.

Figure 9:
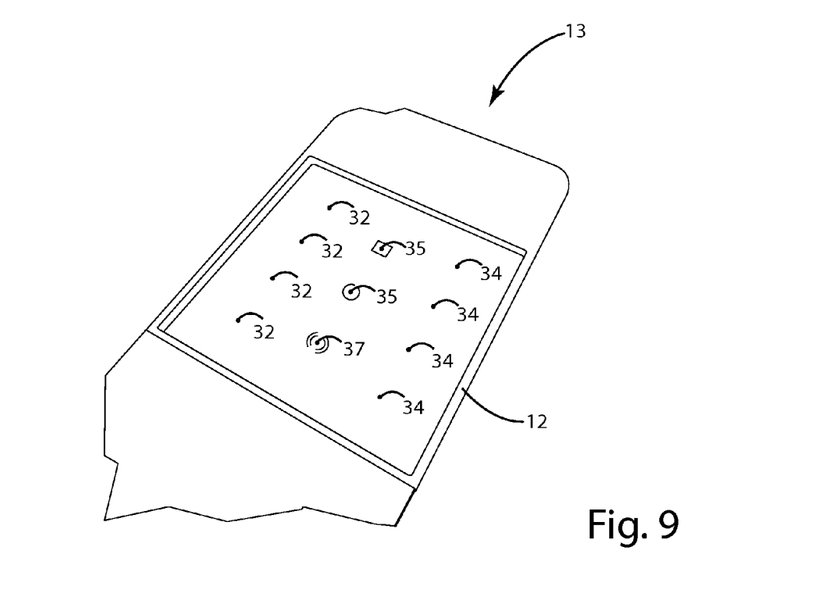
FIG. 9 is a touch interface of a video switch system according to a current embodiment of the present invention.
Figure 10:
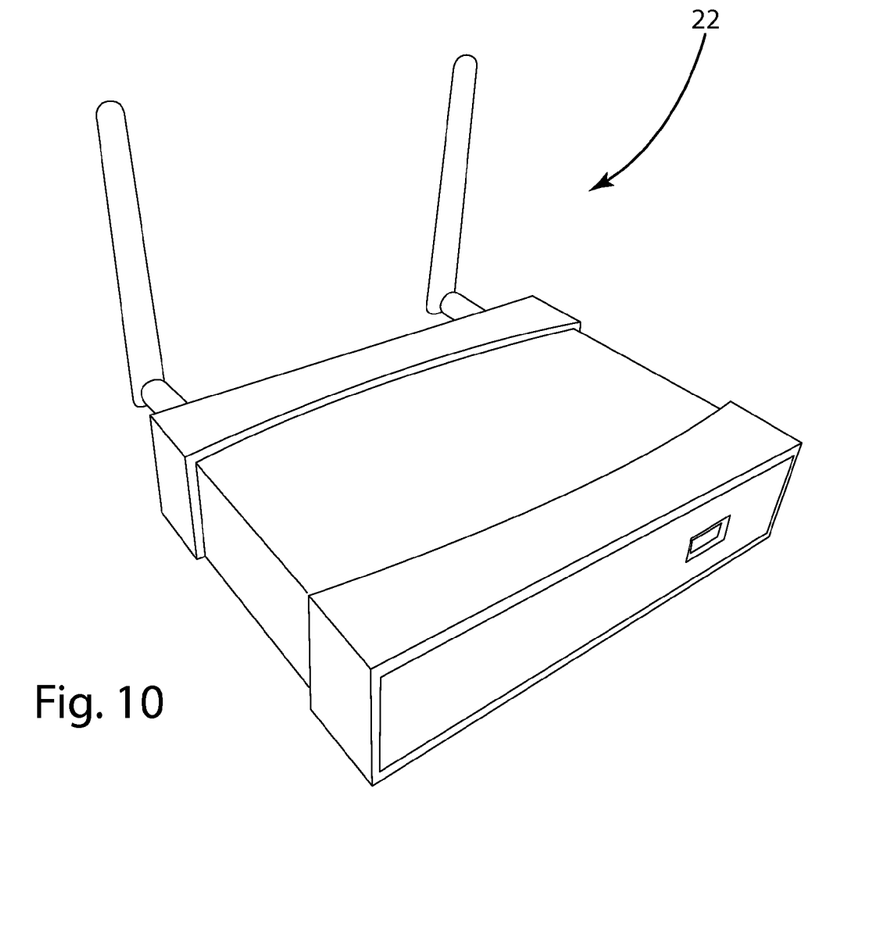
FIG. 10 is a wireless presentation system of a video switch system according to a current embodiment of the present invention.

Turning to the illustrated embodiment of FIG. 9, the touch sensitive interface 12 may have four vertical dots 32 on the left and four vertical dots 34 on the right. These dots may function as indicators and as inputs to allow a user to select their device for display, and to choose if their device goes onto a display. When using two monitors 100, the double set of dots 32, 34 may allow users to choose which source device is displayed on the left and/or the right display 100. For example, each source device may be associated with two dots, one left hand dot 32 and one right hand dot 34. By selecting one of these dots 32, 34, the user may choose which monitor 100, left or right in a two monitor system, to display video from their source device. Indicators, such as indicators 32, 34, 35, 36, 37, on the touch sensitive interface 12 may indicate three states of activity: 1) off/disabled, 2) Standby/ready, 3) Active/displaying. The three states of activity are displayed through LED lights below the touch sensitive interface as 0% brightness, 50% brightness, and 100% brightness. This could also be described as: Off, Dim, and Bright. Indicators 32, 34, 35, 36, 37 may also provide information about the on/off status of the video switch system 10, whether a Wireless Video mode is available, active/inactive states, or a combination thereof. The indicators 32 and 34 may each be associated with an input source selection button as outline above. Additionally, the indicators 35, 36, 37 may also be associated with input buttons to provide various additional functionality. For example, the input button 36 may operate as a power button to turn ON and OFF the system 10, and to indicate the corresponding status of the system. The input button 37 may operate as a wireless connection button to facilitate a wireless connection between a source device and the monitor 100. The input button 35 may operate as a video conferencing button to facilitate displaying video on the monitor 100 from a remote source.

In one example, operation of the indicators 32, 34 may change brightness based on whether a device is connected and whether that device is selected for display. Specifically, when a user's device is connected to a cable, a corresponding indicator 32, 34 may display a dimly lit dot or identifier on the interface 12. This dimly lit identifier may indicate the user's device is connected and may be selected for presentation on the monitor. At this stage, if the user selects (e.g., by touching) the corresponding indicator 32, 34, the system 10 may display the signals from the user's source device and increase the brightness of the indicator 32, 34 in order to indicate to the user that the user's source device is being displayed.

The system 10 in the current embodiment may be capable of operating in one or more modes, such as the Video Conference mode outlined above, and which may affect operation of the interface 12. For example, in the Video Conference mode and if two monitors 100 are available for use, the system 10 may prohibit use of the right hand input buttons 34 while allowing the left hand input buttons 32 to display video from source devices both locally and remotely, as desired. In this example, the right hand input buttons 34 would be capable of selecting the right hand monitor 100 but for the Video Conference mode using that monitor as a display. Thus, by disabling the right hand input buttons 34, the users may be prevented from interrupting the video conference feed to the right hand monitor 100.

In one embodiment, several touch interfaces 12 may be connected in parallel to the switching unit 18 to minimize reach of the user, such as in the case of a large conference table. In the off/disabled mode, the power button 36 of the touch interface 12 may be dimly lit while the other buttons are off to indicate to the user to power on the system 10 as a first step.

The switching unit 18 may use a number of logical determinations to provide a comfortable and easy user experience, even when it is used for more complex tasks like video conferencing. The switching unit 18 may sense the following: number of outputs (monitors 100), number of inputs (sources), types of outputs, types of inputs, extended display identification data (EDID) from outputs, if a video conference system is connected, if a wireless video presentation system is connected, power states of outputs (through the use of a power relay pod 22), video signal resolution, and audio signal type/quality. As it is able to sense these things, it may then determine the appropriate experience for each session.

As an example, if users would like to have a video conferencing session, they may press the video conference button 35 on the touch sensitive interface 12. The system 10 may first check to make sure a video conference system is connected, then it could determine how many monitors 100 (outputs) are connected. If two monitors 100 are connected, it may display the remote participant video on the right monitor 100 and disable the right side video switching buttons on the touch sensitive interface 12 to prevent users from overriding the video conference. The system 10 may enable the left side video switching buttons so that any time a user displays their content, the system 10 can send the signal to the remote side and display the content on the local left screen 100.

In yet another embodiment, the system 10 may provide audio outputs for alternative listening devices, such as assistive listening devices or external speakers. These audio outputs may be integrated within the switching device 18 or provided via modular cards 14 with corresponding audio output interfaces for the alternative listening device or devices. Alternatively, the audio outputs may be provided via other components of the system 10, such as the monitor 100 or audiovisual equipment (not shown).

The present invention may also include two-way control communication via RS-232 protocols (or other protocols such as Consumer Electronics Control (CEC)) to connect with external control devices. For example, the enclosure 11 of the illustrated embodiments of FIGS. 1-2 and includes an RS-232 control box 15 that may control operation of the IEC power relay 20 connected to the monitor 100. With this configuration, the control box 15 may turn power on and off from the power box and connector 16 to the monitor 100. In alternative embodiments, illustrated in FIG. 12, the IEC power relay 20 may have an RS-232 interface 62 capable of receiving a command from the control box 15, instructing the IEC power relay 22 current power on or off.

The present invention may also feature an auxiliary video input port that can be used to override the system idle screen. This may allow customization of the idle process in terms of what is shown on the screen when the system is not in use.

In one embodiment, the present invention may be configured with a wireless connection between the switching unit 18 and the monitor(s) 100.

In one embodiment, the present invention may be configured for use with multiple monitors 100, such as four monitors rather than the single or two monitor configurations described above. The touch interface 12 or WPS graphic user interface may be created in an expanded format to control more than the single or dual monitors described above.

In one embodiment, the present invention may be configured to display wired and/or wireless images on the same monitor 100 with a split screen mode.

In one embodiment, the hatch 13 may be configured with a sliding lid 42 as shown or swinging lid or no lid configurations. The hatch 13 in the illustrated embodiment is shown with upward facing outlets but may be configured with outlets angled away from an upward orientation. The hatch 13 may be configured with power outlets, low voltage (data) jacks and/or cavity for cable connector heads.

In one embodiment, the touch interface 12 may be accomplished with button, membrane, capacitive switch or the like, and maybe powered by the switching device 18. Alternatively, the touch interface 12 may be coupled to a power source separate from the power source of the switching device 18, but may still remain in operable communication with the switching device 18 so that it can control operation of the switching device 18 as outlined herein.

In one embodiment, a remote control unit (not shown) may be used that allows the switching unit 18 to be turned on/off and selection of other functions mentioned above—e.g., image source selection, wireless/video conference mode selection etc. If a remote control is used, the touch interface 12 may not be used.

As an example, the remote control unit may be a smart phone. The smart phone may be used to turn the switching unit on/off and for selection of other functions mentioned above—e.g., image source selection, wireless/video conference mode selection, etc. The smart phone application software may have a graphic user interface that is similar to the touch interface 12 and/or WPS controller.

In one embodiment, switching units 18 may be connected in parallel to allow for more inputs or outputs than a single switching unit 18.

In the illustrated embodiment of FIGS. 5-8, input or output portions of the switching unit 18 may be modular in construction so that sections can be easily replaced to service or change from VGA to HDMI or another connector configuration. The current embodiment may be configured with VGA and HDMI input connectors but it is foreseeable that another connector style may be introduced in the future. For example, modular input or output cards 14, such as those shown in the illustrated embodiments of FIGS. 5-8, may be coupled or inserted into the switching unit 18 to provide various functionality to the system 10, including providing, for example, audio, VGA, HDMI, Displayport, Ethernet, DVI-D, FireWire, and coaxial interfaces. It should be understood that modular cards 14 are not limited to providing a single interface. For example, a modular card 14 may provide both audio and VGA interfaces, or VGA and HDMI interfaces.

In one embodiment, the switching unit 18 may have a video input and/or an output connector or connectors 52 compatible with Ethernet or WIFI streaming for larger area sharing. Other interface types 52 include those mentioned above, such as VGA, HDMI, Display port, DVI-D, FireWire, USB and coax.

In one embodiment, the switching unit 18 may generate or receive infrared or radio frequency signals to control auxiliary audio-visual equipment.

In one embodiment, the switching unit 18 may interface with auxiliary equipment via RS-232 or other techniques to control building control systems such as lighting/blinds/shades or other equipment.

In one embodiment, the switching unit 18 may provide low voltage AC or DC to other external devices potentially eliminating the need for separate power supplies. The low voltage may be connected to USB or other style ports in the hatch unit for power devices typically used above the table top. In one embodiment, the USB connector in the switching unit 18 may also be used for software/firmware upgrades, to allow access to software for connecting wirelessly to the WPS 22, or a combination thereof.

Figure 11:
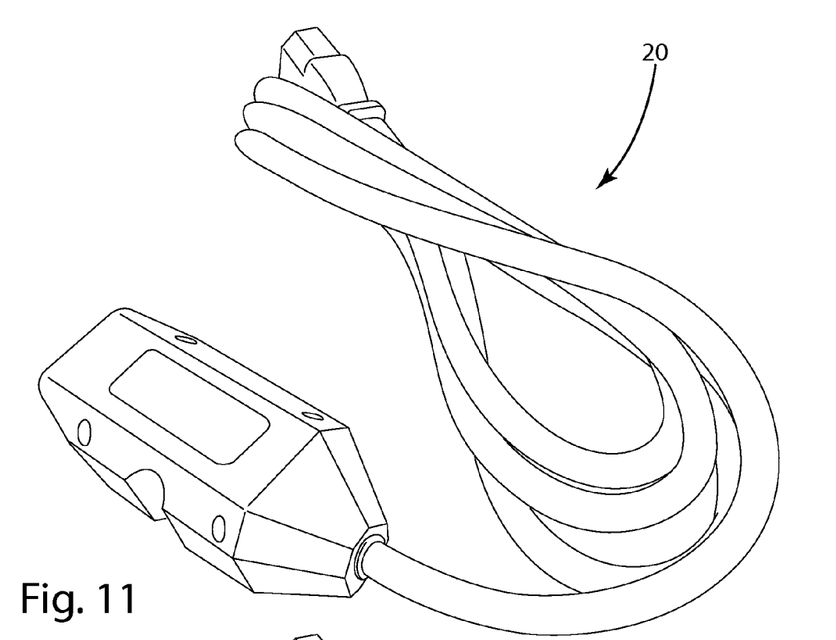
FIG. 11 is a power relay control pod of a video switch system according to a current embodiment of the present invention.
Figure 12:
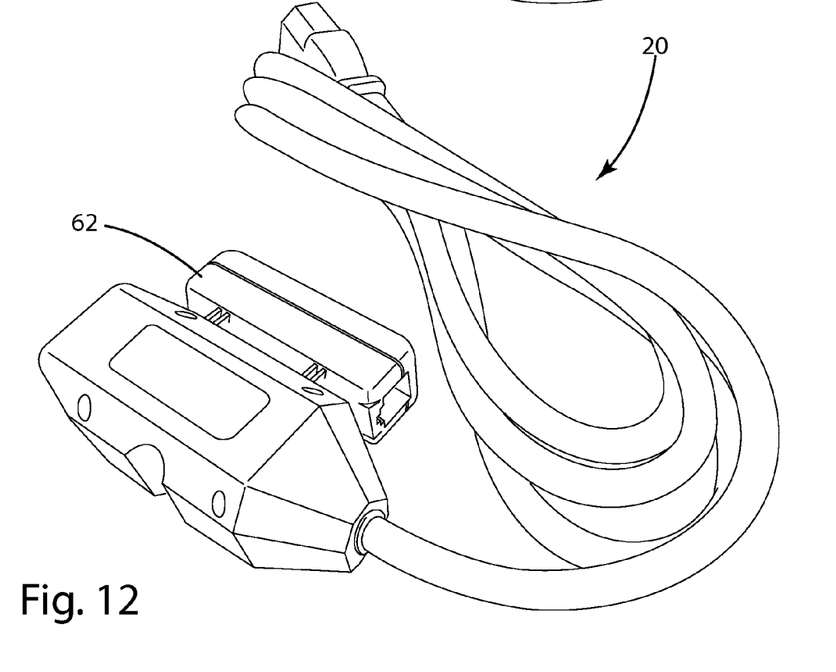
FIG. 12 is a power relay control pod of a video switch system according to a current embodiment of the present invention.

One embodiment according to the present invention may comprise one or more of the following components:
a hatch 13 with interface holder (FIGS. 3 and 4);
a modular video/audio input card 14 (FIGS. 5 and 6);
a switching unit 18 (FIGS. 7 and 8);
a touch interface 12 (FIG. 9);
a wireless presentation system 22 (FIG. 10); and
a power relay control pod 20 (FIGS. 11 and 12).

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A video switch system for at least one user to collaboratively display information on at least one monitor, said video switch system comprising:
a switching unit operable to receive, via a modular interface, one or more first video sources from one or more respective user devices, said switching unit operable to direct said one or more first video sources to the at least one monitor, wherein the one or more respective user devices are associated with the at least one user;
wherein said modular circuit card interface includes one or more modular circuit cards capable of removable insertion within the switching unit, each of said one or more modular circuit cards configured to provide a connector interface capable of connecting said switching unit with one of the respective devices in order to receive video information therefrom;
a wireless presentation system operably connected to said switching unit, said wireless presentation system configured to receive one or more second video sources via a network interface, wherein said wireless presentation system is configured to direct at least one of said one or more second video sources to said switching unit in a wireless video mode; and
a hardware operator interface operably connected to said switching unit, said hardware operator interface including a user shareable input control device separate from said switching unit and separate from said one or more respective user devices, said user shareable input control device including a first user selectable input and a wireless video mode selection input selectable by the at least one user, wherein said first user selectable input and said wireless video mode selection input are co-located to define a shareable user interface of said user shareable interface;
wherein in response to said first user selectable input being selected, said operator interface commands said switching unit to direct at least one of said first video sources to the at least one monitor, wherein in response to said wireless video mode selection input being selected, said switching unit is configured in said wireless video mode and directs at least one of said second video sources to the at least one monitor.

2. The video switch system as claimed in claim 1 wherein said user shareable input control device includes a touch sensitive interface.

3. The video switch system as claimed in claim 1 wherein said user shareable input control device is at least one of (a) a remote control capable of wireles sly communicating with said switching unit and (b) electrically connected to the switching unit.

4. The video switch system as claimed in claim 1 wherein said switching unit is configurable in said wireless video mode to direct said at least one of said second video sources and said at least one of said first video sources to the at least one monitor.

5. The video switch system as claimed in claim 1 wherein said switching unit is capable of merging said at least one second video source and said at least one first video source for simultaneous display on one of the at least one monitor.

6. The video switch system as claimed in claim 1 wherein said first user selectable input is associated with a first user device of said respective user devices;
wherein said user shareable input control device includes a second user selectable input in addition to said first user selectable input, said second user selectable input being associated with a second user device of said respective user devices;
wherein said first and second user selectable inputs are configured to indicate at least two indication states by changing light intensity.

7. The video switch system as claimed in claim 6 wherein in response to said first user respective device being connected to said switching unit via said modular interface, said first user selectable input transitions from an off indication state to a standby indication state by increasing a light intensity of said first user selectable input; and
wherein in response to the at least one user selecting said first user selectable input, said first user selectable input transitions from said standby indication state to an active indication state by further increasing said light intensity of said first user selectable input.

8. The video switch system as claimed in claim 7 wherein in response to said first user selectable input being selected, said switching unit directs a video source of said first user device to the at least one monitor, and wherein in response to said second user selectable input being selected, said switching unit directs a video source of said second user device to the at least one monitor.

9. The video switch system as claimed in claim 1 wherein the at least one monitor includes a plurality of monitors, wherein said first user selectable input is associated with a first user device of said respective user devices;
wherein said user shareable interface includes a second user selectable input in addition to said first user selectable input, said second user selectable input being associated with said first user device;
wherein in response to said first user selectable input being selected, said switching unit directs a video source of said first user device to one of the plurality of monitors, and wherein in response to said second user input being selected, said switching unit directs the video source of said first user device to another of the plurality of monitors, whereby selection of said first or second user selectable inputs enables the at least one user to choose which of the plurality of monitors displays the video source of the first user device.

10. The video switch system as claimed in claim 1 wherein said network interface of said wireless presentation system includes at least one of an Ethernet cable and a wireless Ethernet transceiver.

11. The video switch system as claimed in claim 10 wherein said wireless presentation system provides a user interface configured to allow the at least one user to select which of said one or more second video sources to direct to said switching unit, and wherein said user interface is further configured to allow the at least one user to select which of said one or more second video sources to direct to the at least one monitor through said switching unit.

12. The video switch system as claimed in claim 1 wherein each of said one or more modular cards are connected by a cable to one of the respective devices.

13. The video switch system as claimed in claim 12 wherein said cable and said operator interface are disposed in proximity to each other near a surface of a conference table.

14. A hardware operator interface for communicating with a video switch system, the video switch system configured to allow at least one user to collaboratively display information on at least one monitor, the video switch system including a switching unit operable to receive a plurality of available video sources and to selectively direct at least one of the available video sources to the at least one monitor, each of the plurality of available video sources being provided by a user device via a direct connection to the video switch system, the video switch system including a wireless video presentation system capable of receiving at least one wireless video source from at least one user wireless capable device and providing a wireless video output corresponding to one or more of the at least one wireless video source, said hardware operator interface comprising:
a user shareable input control device separate from the switching unit and separate from the user device, said user shareable input control device being configured to operably connect to the switching unit of the video switch system, said user shareable input control device having a plurality of user selectable inputs, wherein each of said plurality of user selectable inputs is capable of being associated with at least one of the plurality of available video sources;
wherein said plurality of user selectable inputs are co-located to define a shareable user interface of said user shareable input control device such that each of the at least one user is allowed to select any of said user selectable inputs via said user shareable interface to direct any of the plurality of available video sources to the at least one monitor, wherein each of said plurality of user selectable inputs is capable of indicating at least two states;
wherein in response to a first user selectable input of said plurality of user selectable inputs being selected by the at least one user, said user shareable input control device commands the switching unit of the video switch system to direct the at least one associated available video source to the at least one monitor and said first user selectable input transitions from one to another of said at least two indication states; and
wherein said user shareable input control device includes a wireless video mode selection input, wherein in response to said wireless video mode selection input being selected, said user shareable input control device commands the video switch system to enable a wireless video mode in which wireless video presentation system accepts the at least one wireless video source from the at least one user wireless capable device.

15. The hardware operator interface as claimed in claim 14 wherein said user shareable input control device is a touch sensitive interface, and wherein said user shareable input control device is electrically connected to the switching unit.

16. The hardware operator interface as claimed in claim 14 wherein said user shareable input control device is a remote control, and wherein said remote control is capable of wirelessly communicating with said video switch system.

17. The hardware operator interface as claimed in claim 14 wherein said first user selectable input is associated with a first user device associated with one of the at least one users;
wherein said user shareable input control device includes a second user selectable input in addition to said first user selectable input, said second user selectable input being associated with a second user device associated with another of the at least one users, wherein said first and second user selectable inputs are configured to indicate at least two indication states by changing light intensity.

18. The hardware operator interface as claimed in claim 17 wherein said first and second user selectable inputs are configured to indicate at least three indication states by changing light intensity.

19. The hardware operator interface as claimed in claim 17 wherein in response to the first user device being connected to the video switch system, said first user selectable input transitions from an off indication state to a standby indication state by increasing a light intensity of said first user selectable input; and
wherein in response to the at least one user selecting said first user selectable input, said first user selectable input transitions from said standby indication state to an active indication state by further increasing said light intensity of said first user selectable input.

20. The hardware operator interface as claimed in claim 19 wherein in response to said first user selectable input being selected, said user shareable input control device commands the video switch system to direct a video source of the first user device to the at least one monitor, and wherein in response to said second user selectable input being selected, said user shareable input control device commands the video switch system to direct a video source of said second user device to the at least one monitor.

21. The hardware operator interface as claimed in claim 14 wherein the at least one monitor is a plurality of monitors, and wherein said first user selectable input is associated with a first user device associated with one of the at least one users;
wherein said user shareable input control device includes a second user selectable input in addition to said first user selectable input, said second user selectable input being associated with said first user device;
wherein in response to said first user selectable input being selected, said user shareable input control device commands the video switch system to direct a video source of the first user device to one of the plurality of monitors, and wherein in response to said second user selectable input being selected, said user shareable input control device commands the video switch system to direct the video source of the first user device to another of the plurality of monitors, whereby selection of said first or second user selectable inputs enables the at least one user to choose which of the at least one monitors displays the video source of the first user device.

22. A video switch system for at least one user to collaboratively display information on at least one monitor, said video switch system comprising:
a switching unit operable to receive, via a modular circuit card interface, one or more first video sources from one or more respective user devices, said switching unit operable to direct said one or more first video sources to the at least one monitor, wherein the one or more respective user devices are associated with the at least one user;
wherein said modular circuit card interface includes one or more modular circuit cards capable of removable insertion within the switching unit, each of said one or more modular circuit cards configured to provide a connector interface capable of connecting said switching unit with one of the respective user devices in order to receive video information therefrom;
a hardware operator interface operably connected to said switching unit, said hardware operator interface including a user shareable input control device separate from said switching unit and said one or more respective user devices, said user shareable input control device being configured to command said switching unit to direct at least one video source to the at least one monitor from among the first video sources; and
wherein said user shareable input control device includes a plurality of user selectable inputs, wherein each of said plurality of user selectable inputs is capable of being associated with said one or more of the first video sources.

23. The video switch system as claimed in claim 22 further comprising a wireless presentation system operably connected to said switching unit, said wireless presentation system configured to receive one or more second video sources via a network interface, wherein said wireless presentation system is configured to direct at least one of said one or more second video sources to said switching unit in a wireless video mode.

24. The video switch system as claimed in claim 23 wherein said user shareable input control device includes a wireless video mode selection input selectable by the at least one user, wherein in response to a first user selectable input being selected from among the plurality of user selectable inputs, said user shareable input control device commands said switching unit to direct at least one of the first video sources to the at least one monitor, wherein in response to said wireless video mode selection input being selected, said switching unit is configured in said wireless video mode and directs at least one of the second video sources to the at least one monitor.

25. The video switch system as claimed in 23 wherein said network interface of said wireless presentation system includes at least one of an Ethernet cable and a wireless Ethernet transceiver.

26. The video switch system as claimed in claim 25 wherein said wireless presentation system provides a user interface configured to allow the at least one user to select which of the one or more second video sources to direct to said switching unit.

27. A hardware operator interface for communicating with a video switch system, the video switch system configured to allow at least one user to collaboratively display information on at least one monitor, the video switch system including a switching unit operable to receive a plurality of available video sources and to selectively direct at least one of the available video sources to the at least one monitor, each of the plurality of available video sources being provided by a user device via a direct connection to the video switch system, said hardware operator interface comprising:

a user shareable input control device separate from the switching unit and separate from the user device, said user input control device being configured to operably connect to the switching unit of the video switch system, said user shareable input control device having a plurality of user selectable inputs, wherein each of said plurality of user selectable inputs is capable of being associated with at least one of the plurality of available video sources;

wherein said plurality of user selectable inputs are co-located to define a shareable user interface of said user input control device such that each of the at least one user is allowed to select any of said user selectable inputs via said shareable user interface to direct any of the plurality of available video sources to the at least one monitor, wherein each of said plurality of user selectable inputs is capable of indicating at least two states; and wherein in response to a first user selectable input of said plurality of user selectable inputs being selected by the at least one user, said user shareable input control device commands the switching unit of the video switch system to direct the at least one associated available video source to the at least one monitor and said first user selectable input transitions from one to another of said at least two states.

28. The hardware operator interface as claimed in claim 27 wherein said user shareable interface is electrically connected to the switching unit via a cable.

\* \* \* \* \*